(12) United States Patent
Joergl et al.

(10) Patent No.: US 8,122,717 B2
(45) Date of Patent: Feb. 28, 2012

(54) INTEGRATION OF AN EXHAUST AIR COOLER INTO A TURBOCHARGER

(75) Inventors: Volker Joergl, Breitenfurt (AT); Olaf Weber, Cupertino, CA (US); Wolfgang Wenzel, Stuttgart (DE)

(73) Assignee: BorgWarner, Inc., Auburn Hills, MI (US)

( * ) Notice: Subject to any disclaimer, the term of this patent is extended or adjusted under 35 U.S.C. 154(b) by 333 days.

(21) Appl. No.: 12/440,480

(22) PCT Filed: Sep. 13, 2007

(86) PCT No.: PCT/US2007/019847
§ 371 (c)(1),
(2), (4) Date: Sep. 28, 2009

(87) PCT Pub. No.: WO2008/033418
PCT Pub. Date: Mar. 20, 2008

(65) Prior Publication Data
US 2010/0043761 A1 Feb. 25, 2010

Related U.S. Application Data

(60) Provisional application No. 60/844,248, filed on Sep. 13, 2006.

(51) Int. Cl.
*F02B 33/44* (2006.01)
*F02B 47/08* (2006.01)
*F02M 25/07* (2006.01)

(52) U.S. Cl. ................. 60/605.1; 60/605.2; 123/568.12; 123/568.13

(58) Field of Classification Search .................. 60/605.1, 60/605.2, 605.3; 123/563, 568.12
See application file for complete search history.

(56) References Cited

U.S. PATENT DOCUMENTS

| | | | |
|---|---|---|---|
| 4,835,963 A * | 6/1989 | Hardy | 60/274 |
| 5,617,726 A | 4/1997 | Sheridan et al. | |
| 5,791,144 A * | 8/1998 | Thompson | 60/599 |
| 6,158,422 A * | 12/2000 | Blank et al. | 123/559.2 |
| 6,367,256 B1 * | 4/2002 | McKee | 60/605.2 |
| 6,805,108 B2 * | 10/2004 | Shaffer et al. | 123/563 |
| 6,981,375 B2 | 1/2006 | Sisken et al. | |
| 7,077,114 B2 | 7/2006 | Husges | |
| 7,451,597 B2 * | 11/2008 | Kojima et al. | 60/605.1 |
| 2003/0150434 A1* | 8/2003 | Leedham et al. | 123/568.12 |
| 2004/0055740 A1 | 3/2004 | Meshenky et al. | |
| 2004/0118389 A1 | 6/2004 | Shaffer et al. | |
| 2004/0244782 A1* | 12/2004 | Lewallen | 123/568.12 |
| 2005/0051145 A1* | 3/2005 | Joyce et al. | 123/563 |
| 2005/0081523 A1* | 4/2005 | Breitling et al. | 60/599 |

(Continued)

FOREIGN PATENT DOCUMENTS

JP 09170539 A 7/1996

(Continued)

*Primary Examiner* — Thomas Denion
*Assistant Examiner* — Cameron Setayesh
(74) *Attorney, Agent, or Firm* — Warn Partners, P.C.

(57) ABSTRACT

The present invention relates to a compressor-cooler module, having a housing, a compressor contained in the housing, and an air cooler disposed within the housing and positioned in the flow path of the compressor. The present invention also includes an intake in fluid communication with the housing, a cooler bypass valve operably associated with the air cooler and the compressor, and a low-pressure exhaust gas recirculation passage operably associated with the cooler bypass valve, and the cooler bypass valve selectively directs exhaust gas to bypass the air cooler.

31 Claims, 4 Drawing Sheets

U.S. PATENT DOCUMENTS

| | | | |
|---|---|---|---|
| 2006/0122762 A1* | 6/2006 | Perkins | 701/102 |
| 2006/0137665 A1* | 6/2006 | Khair et al. | 123/568.12 |
| 2006/0162706 A1* | 7/2006 | Rosin et al. | 123/568.12 |
| 2007/0017489 A1* | 1/2007 | Kuroki et al. | 123/568.12 |
| 2007/0175456 A1* | 8/2007 | Tally | 123/559.1 |
| 2007/0181105 A1* | 8/2007 | Bazika | 123/563 |
| 2010/0043761 A1* | 2/2010 | Joergl et al. | 123/563 |
| 2010/0108040 A1* | 5/2010 | Simons et al. | 123/563 |

FOREIGN PATENT DOCUMENTS

| | | |
|---|---|---|
| KR | 10 2001 0014436 A | 2/2001 |
| WO | WO 2006/122306 | 11/2006 |

* cited by examiner

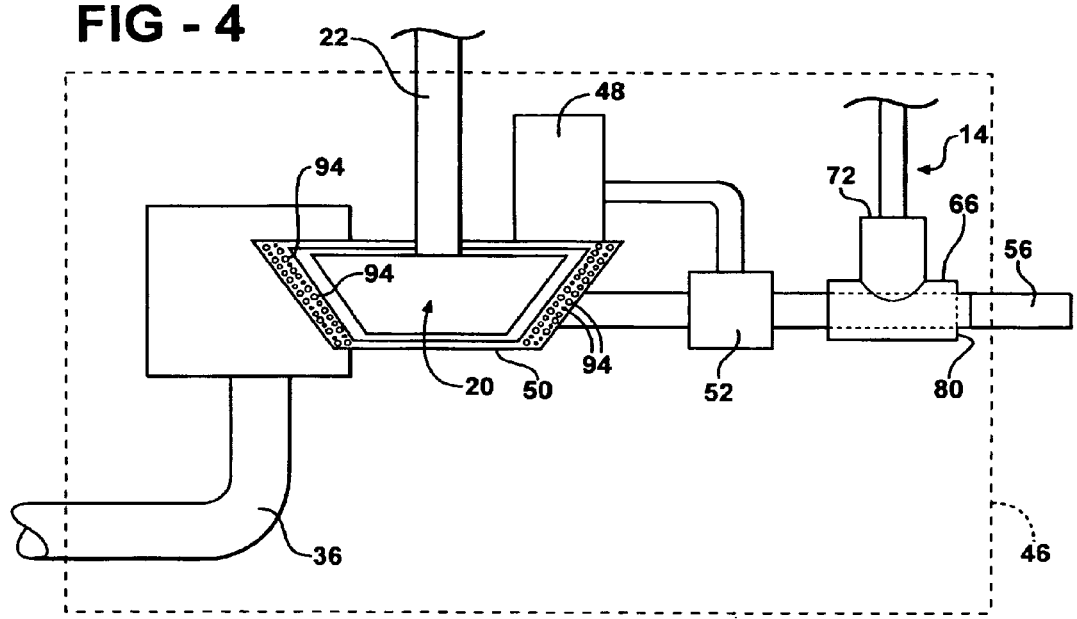
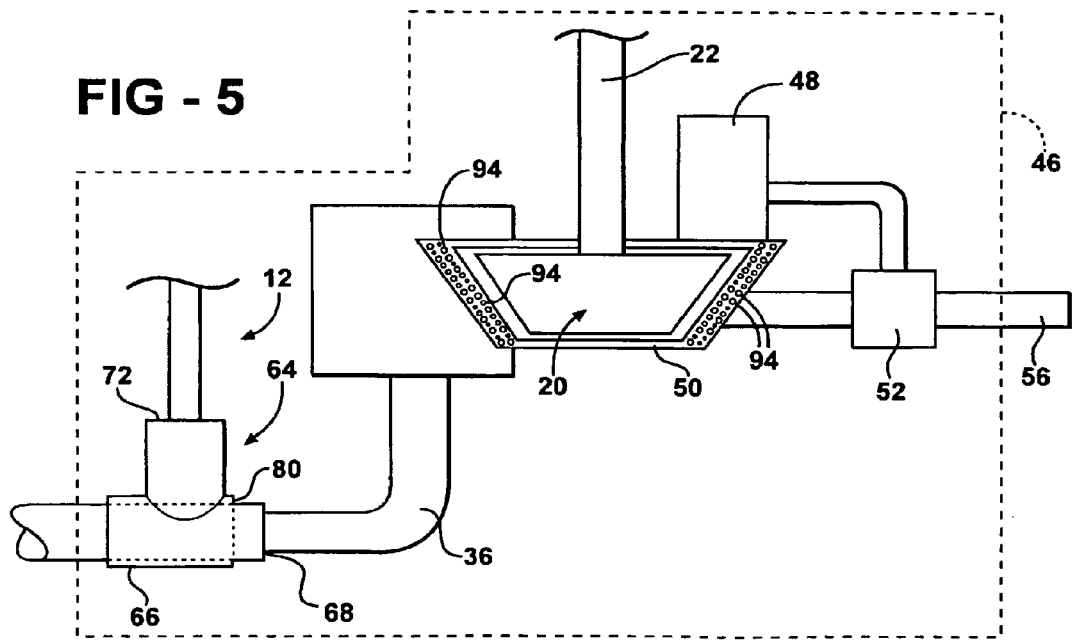

INTEGRATION OF AN EXHAUST AIR COOLER INTO A TURBOCHARGER

CROSS-REFERENCE TO RELATED APPLICATIONS

This application claims the benefit of U.S. Provisional Application No. 60/844,248 filed Sep. 13, 2006.

FIELD OF THE INVENTION

The present invention relates to an engine assembly having an exhaust air cooler integrated into a turbocharger.

BACKGROUND OF THE INVENTION

Current and future emissions requirements for diesel engines in Europe, the United States and most foreign markets will require engine concepts capable of achieving low Oxides of Nitrogen (NOx) and low Particulate Matter (PM) emissions while at the same time having a high integration of components and functions with lowered costs. Emissions reduction systems, like low-pressure exhaust gas recirculation (EGR) are required while cooling of the intake air becomes more and more important in order to reduce unwanted emissions. Integration of the different intake gas coolers like a charge air cooler or a low-pressure EGR cooler into one casting including a compressor of a turbocharger can provide improved compressor efficiency, reduced overall costs and smaller packaging.

SUMMARY OF THE INVENTION

The present invention relates to a compressor-cooler module, having a housing, a compressor contained in the housing, and an air cooler disposed within the housing and positioned in the flow path of the compressor. The present invention also includes an intake in fluid communication with the housing, a cooler bypass valve operably associated with the air cooler and the compressor, and a low-pressure exhaust gas recirculation passage operably associated with the cooler bypass valve. The cooler bypass valve selectively directs exhaust gas to bypass the air cooler.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a schematic view of an alternate embodiment incorporating a separator unit upstream of a compressor, according to the present invention;

FIG. 5 is a schematic view of an alternate embodiment incorporating a separator unit downstream of a compressor, according to the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 2:
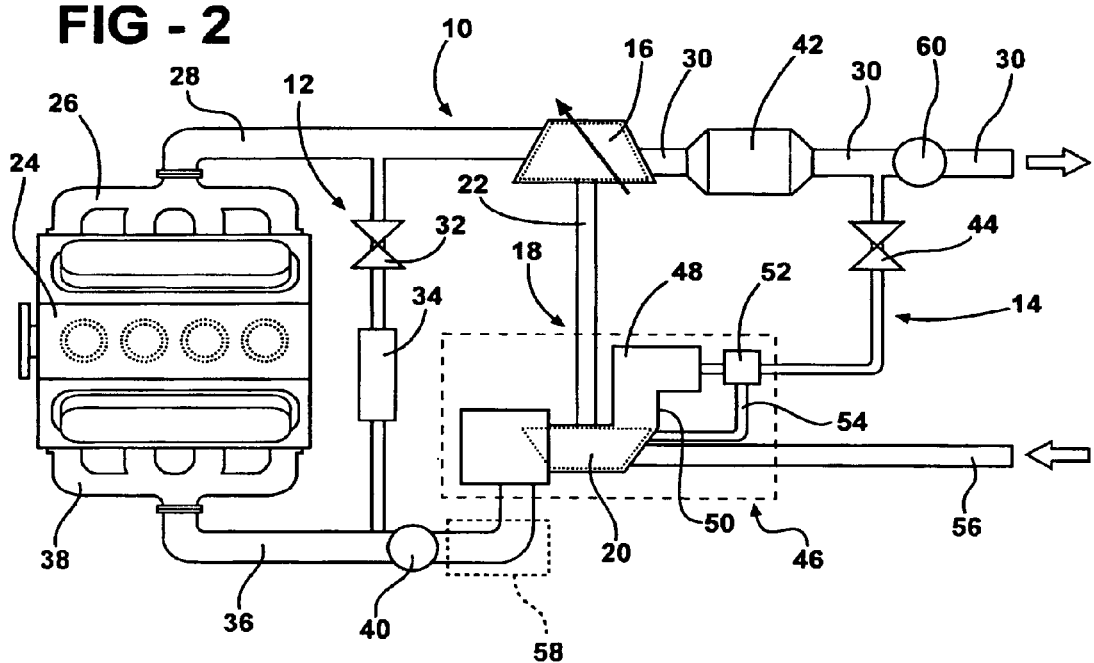
FIG. 2 is a schematic view of an exhaust air cooler integrated into a turbocharger, according to the present invention.

FIG. 2 is a schematic view of a system 10 according to the present invention. The system has a high-pressure EGR loop 12 and a low-pressure EGR loop 14. The low-pressure EGR loop 14 is downstream of a turbine 16, which is part of a turbocharger unit 18 having a compressor 20. The low-pressure EGR loop 14 is upstream of the compressor 20. The turbine 16 and compressor 20 are connected through the use of a shaft 22. The high-pressure EGR loop 12 is located downstream of the compressor 20, and upstream of the turbine 16.

Exhaust gas is generated by an engine 24, and exits through an exhaust gas manifold 26. Connected to the exhaust gas manifold 26 is an exhaust gas conduit 28, which is used for delivering the exhaust gas to either the high-pressure EGR loop 12, or the turbine 16. If the exhaust gas passes through the turbine 16, the exhaust gas will flow into an exhaust pipe 30, where the exhaust gas will then flow through either the low-pressure EGR loop 14, or out of the exhaust pipe 30 into atmosphere.

If exhaust gas is recirculated through the high-pressure EGR loop 12, the exhaust gas will pass through an EGR valve 32, an EGR cooler 34 and is then introduced to an intake pipe 36 that leads to an intake manifold 38. To create enough EGR-flow through, the EGR valve 32 can be adjusted accordingly. If the valve 32 is fully open and more flow through is required, the intake pipe 36 also includes an intake throttle valve 40 which can be adjusted to create more flow down stream of the valve 32, thereby increasing flow the high-pressure EGR loop 12 into the intake pipe 36.

If exhaust from the engine 24 is recirculated in the low-pressure EGR loop 14, the exhaust gas passes through the variable turbine 16, and into the exhaust pipe 30. Disposed in the exhaust pipe 30 is a diesel particulate filter (DPF) 42, where the exhaust gas is cleaned of soot and carbon monoxide and hydrocarbons. After going through the DPF 42, an EGR valve 44 in the low-pressure loop 14 is opened to allow the exhaust gas to flow through the low-pressure EGR loop 14 into a compressor-cooler module, generally shown at 46.

Figure 3:
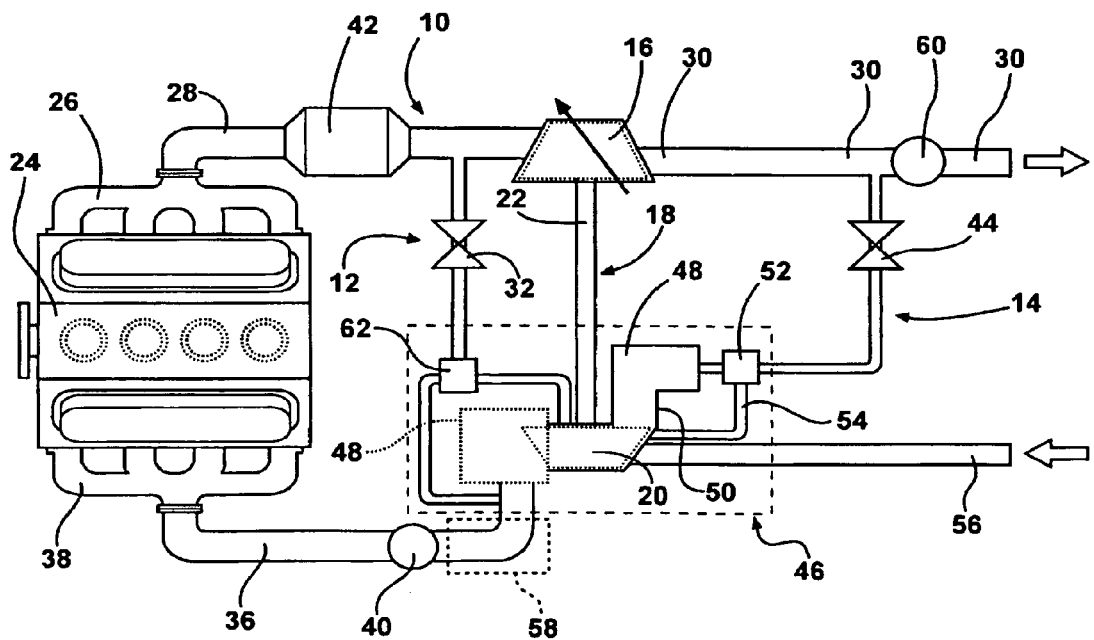
FIG. 3 is a schematic view of an alternate embodiment of an exhaust air cooler integrated into a turbocharger, according to the present invention.

The compressor-cooler module 46 contains the compressor 20 and a cooler 48 integrated into a single housing 50. The cooler 48 can be positioned upstream of the compressor 20 as shown in FIG. 2, or in an alternate embodiment shown in FIG. 3, the cooler 48 can be positioned downstream of the compressor 20. It is also possible to have two coolers 48, one upstream and one downstream of the compressor 20. In applications where the cooler 48 is positioned upstream of the compressor 20, an EGR cooler bypass valve 52 is used to bypass incoming exhaust gas around the cooler 48 so the exhaust gas selectively flows through a bypass conduit 54 and is introduced directly into the compressor 20, instead of flowing through the cooler 48. Fresh air is introduced through an intake, or intake duct 56, mixed with exhaust gas from the low-pressure EGR loop 14, if present, and is compressed by the compressor 20, cooled by a second charge-air cooler 58, and flows through the throttle valve 40. The gas mixture then mixes with EGR flowing through the high-pressure EGR loop 12 before flowing into the intake manifold 38. Other engine layouts may include only one EGR loop or multiple turbo chargers. As shown in FIG. 3, the second charge-air cooler 58 is located downstream of the compressor 20 and cooler 48, which allows the charge-air cooler 58 to further reduce the temperature of the compressed air.

The low-pressure EGR cooler 48 is typically located in the path of the low-pressure EGR loop 14. The low-pressure EGR valve 44 is a stand alone valve bolted into the low-pressure EGR path 14 or the cooler 48. The low-pressure EGR valve 44 can be positioned either before (i.e., functioning as a "hot side valve") or after the cooler 48 (i.e., functioning as a "cold side valve"). The EGR valve 44 can be a poppet type, a flapper type valve, or other similar valve type. If the cooler 48 is located downstream of the compressor 20, the exhaust gas and air mixture will flow into the charge-air cooler 58.

As shown in FIGS. 2 and 3, an exhaust throttle valve 60 is located in the exhaust pipe 30 somewhere downstream of the low-pressure EGR loop 14 to control the flow and pressure of exhaust gas downstream of the turbine 16. The low-pressure EGR valve 44 and the exhaust throttle 60 can also be integrated into a combined module (using either one or two actuators). This module can be located either on the exhaust side or on the intake side at the junction of the low-pressure EGR loop 14.

FIG. 3 also depicts an alternate embodiment of the invention where the high-pressure EGR loop 12 passes through the module 46. The EGR valve 32 is contained in the module 46 and controls the flow of exhaust gas from the engine 24 into the module 46. In this embodiment, the particulate filter 42 is located upstream of the variable turbine 16, and filters the exhaust gas before the exhaust gas enters the module 46 through either the low-pressure or high-pressure EGR loops 12,14. In addition to the EGR valve 32 being located in the module 46, there is also a charge-air cooler bypass valve 62 that can direct the flow of exhaust gas flowing through the EGR valve 32 around the compressor-cooler module 46 components.

Figure 6:
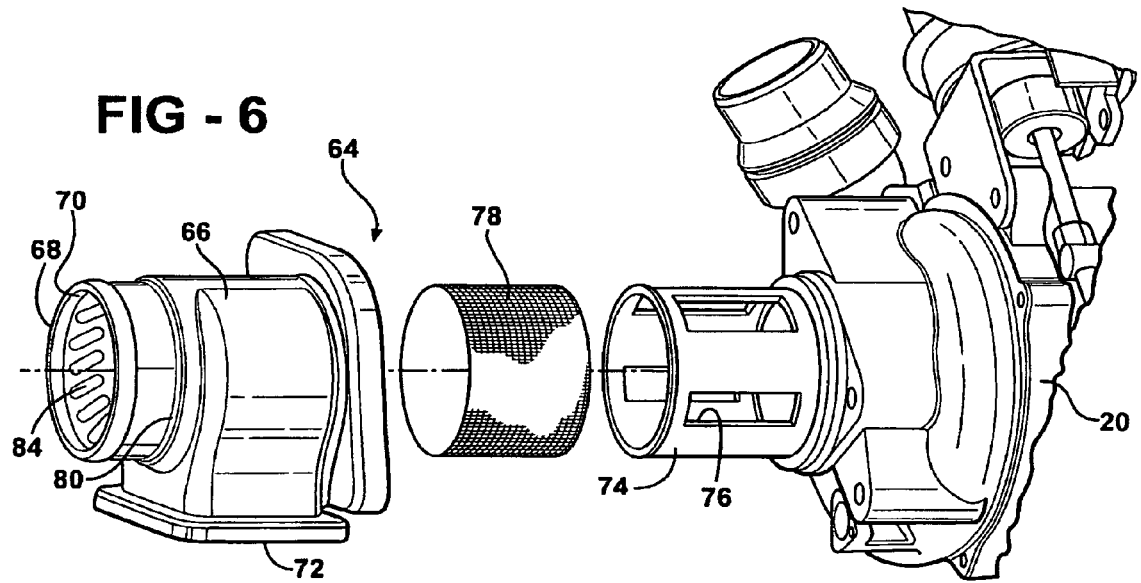
FIG. 6 is an exploded view of a separator unit, according to the present invention.
Figure 7:
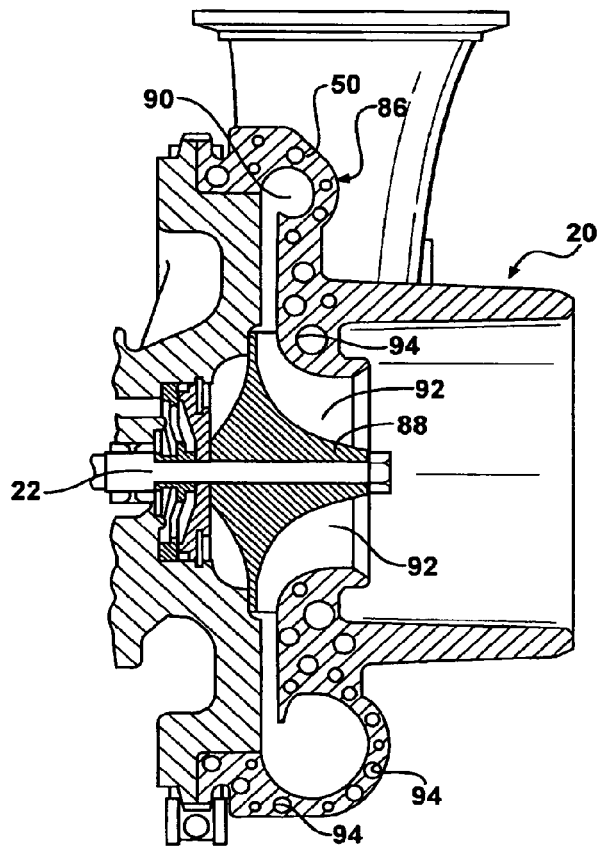
FIG. 7 is a sectional side view of a compressor having a silencer, according to the present invention.

Other embodiments of the present invention are shown in FIGS. 4-7, wherein like numbers refer to like elements. In FIGS. 4, 6, and 7, a separator unit, generally shown at 64, is integrated into the compressor-cooler module 46. The separator unit 64 includes a cover 66 which is connected to the intake duct 56 and the low-pressure EGR loop 14. The cover 66 is connected to the intake duct 56 through the use of a circular flange 68 having an aperture 70, and is connected to the low-pressure EGR loop 14 through the use of a square-shaped flange 72, which extends from the cover 66 in a perpendicular manner relative to the circular flange 68. The cover 66 is hollow, and receives a mixer 74. The mixer 74 is a generally cylindrical-shaped member which includes a series of apertures 76; the mixer 74 is surrounded by a separator 78. The separator 78 is made of a wire mesh which traps and retains debris from the exhaust gas flowing through the low-pressure EGR loop 14. The mixer 74 can be formed as part of the housing 50, or the mixer 74 can be formed as a separate component. The mixer 74 and separator 76 as described herein reduces the velocity of the air flowing which will also reduce the pressure drop of the air flow going into the compressor 20, thereby improving the efficiency of the compressor 20.

When the mixer 74 is disposed within the cover 66, the mixer 74 will abut a shoulder 80 formed as a portion of the cover 66. This will ensure that any exhaust gas flowing into the cover 66 will be forced to flow through the separator 78, and then the apertures 76 of the mixer 74. After the exhaust gas has passed through the apertures 76, the exhaust gas will mix with the fresh air flowing into the aperture 70. The mixture of fresh air and exhaust gas will then flow into the compressor 20, or the cooler 48, depending on whether the bypass valve 52 is open or closed.

The separator unit 64 also includes a swirler 82 having a plurality of vanes 84. As air enters the separator unit 64, the vanes 84 will act to create turbulence in the flow of the air, which allows the air to mix with the exhaust gas more effectively when flowing through the mixer 74.

The separator unit 64 described in FIG. 4 is incorporated to be used with the low-pressure EGR loop 14. However, FIG. 4 shows the separator unit 64 incorporated for use with the high-pressure EGR loop 12. In this embodiment, fresh air, which has already been compressed by the compressor 20, flows through the intake pipe 36 and into the aperture 70. The compressed fresh air then mixes with exhaust gas flowing into the separator unit 64 from the high-pressure EGR loop 12, and flows into the intake manifold 38. The high-pressure EGR loop 12 is connected to the square-shaped flange 72, and feeds exhaust gas into the cover 66.

Figure 1:
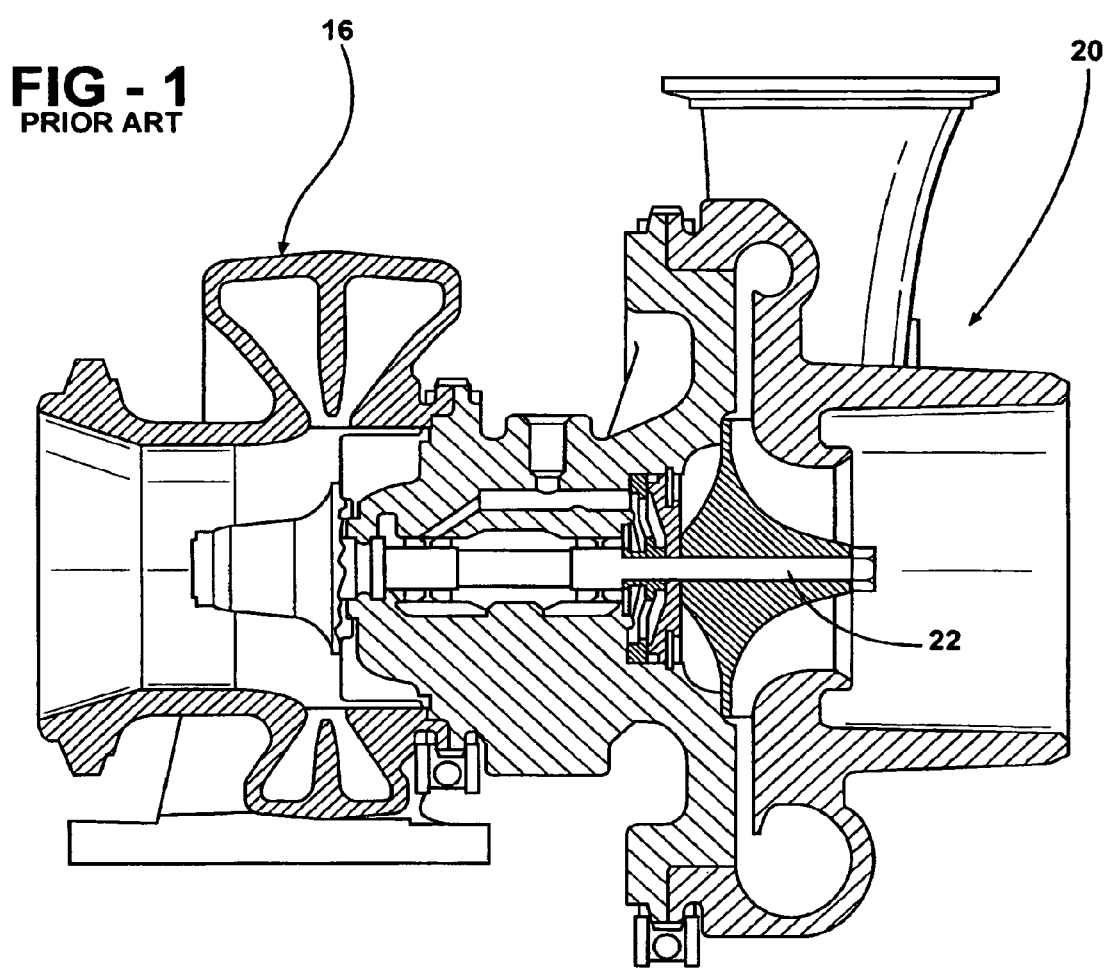
FIG. 1 is a sectional side view of a prior art turbocharger unit.

Another embodiment of the present invention is shown in FIGS. 4, 5, and 7. In this embodiment, a silencer, generally shown at 86, is incorporated as a portion of the compressor-cooler module 46. The silencer 86 is formed as part of the housing 50. This is in contrast to FIG. 1, which shows a turbocharger unit which does not have a silencer 86. A cross-sectional view of the compressor 20 according to this embodiment is shown in FIG. 7. The compressor 20 includes a compressor wheel 88 which is mounted on the shaft 22. Surrounding the compressor wheel 88 is a volute 90. In operation, as the compressor wheel 88 rotates, fins 92 compress air flowing into the compressor 20, and force the air into the volute 90, where the compressed air is then forced into the intake duct 36. The silencer 86 includes a series of chambers 94 formed in the housing 50. The chambers 94 are circular in cross-section, and circumscribe the volute 90. The chambers 94 are hollow, and have different diameters for reducing noise generated by the compressor 20. The different diameter chambers 94 will each have a different natural frequency, and thereby offset the various frequencies generated by the compressor 20 as the compressor wheel 88 rotates at various speeds.

In another embodiment, the chambers 94 are all of the same diameter, and include a filler (not shown). The filler is a rubber or silicone based filler, which absorbs vibration. Other cross-sectional shapes may be used as well, such as square, rectangular, triangular, trapezoidal, or other shapes which would reduce noise in the compressor 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A compressor-cooler module, comprising:
a housing;
a compressor contained in said housing;
an air cooler disposed within said housing and positioned in the flow path of said compressor;
an intake in fluid communication with said housing;
a cooler bypass valve operably associated with said air cooler and said compressor; and a low-pressure exhaust gas recirculation passage operably associated with said cooler bypass valve, and said cooler bypass valve selectively directs exhaust gas to bypass said air cooler.

2. The compressor-cooler module of claim 1, further comprising a separator unit formed as a portion of said housing, located upstream or downstream of said compressor.

3. The compressor-cooler module of claim 1, said separator unit further comprising:
- a cover in fluid communication with said compressor and said air cooler;
- a mixer disposed within said cover of said separator unit; and
- a separator disposed about said mixer such that exhaust gas entering said cover passes through said separator before entering said mixer causing any particles in the exhaust gas to be removed, and after exhaust gas passes through said separator and flows into said mixer.

4. The compressor-cooler module of claim 3, further comprising a swirler formed as a portion of said cover.

5. The compressor-cooler module of claim 4, further comprising:
- a plurality of vanes formed in said swirler for reducing the velocity of air flowing into said swirler; and
- at least one opening formed in said mixer, said mixer being substantially cylindrical in shape, and exhaust gas passes through said at least one opening formed in said mixer as exhaust gas enters said mixer.

6. The compressor-cooler module of claim 3, said separator further comprising a wire mesh.

7. The compressor-cooler module of claim 1, further comprising a silencer incorporated for use with said compressor, said air cooler, or a combination of both.

8. The compressor-cooler module of claim 7, said silencer further comprising a series of chambers formed in said housing of said compressor.

9. The compressor-cooler module of claim 8, wherein said series of chambers are of different sizes.

10. The compressor-cooler module of claim 8, wherein said series of chambers are of the same size and filled with a filler, and said filler reduces the noise produced by said compressor.

11. The compressor-cooler module of claim 10, said filler is one selected from the group consisting of rubber, silicone, and nylon.

12. A compressor-cooler module, comprising:
- a housing;
- a compressor contained in said housing;
- an air cooler disposed within said housing and positioned in the flow path of said compressor;
- at least one exhaust gas recirculation valve contained in said housing;
- an intake in fluid communication with said housing;
- a cooler bypass valve operably associated with said air cooler and said compressor;
- a high-pressure exhaust gas recirculation passage operably associated with said compressor; and
- a low-pressure exhaust gas recirculation passage operably associated with said compressor, and said at least one exhaust gas recirculation valve selectively directs exhaust gas from either of said low-pressure exhaust gas recirculation passage or said high-pressure exhaust gas recirculation passage to said air cooler, and said cooler bypass valve selectively directs exhaust gas to bypass said air cooler.

13. The compressor-cooler module of claim 12, further comprising a separator unit formed as a portion of said housing, located upstream or downstream of said compressor.

14. The compressor-cooler module of claim 13, said separator unit further comprising:
- a cover in fluid communication with said compressor and said air cooler;
- a mixer disposed within said cover of said separator unit;
- a plurality of openings formed in said mixer such that as exhaust gas enters said mixer, exhaust gas will pass through said plurality of openings; and
- a separator disposed about said mixer such that exhaust gas entering said cover passes through said separator before entering said plurality of openings of said mixer, causing any particles in the exhaust gas to be removed, and after exhaust gas passes through said separator and flows into said mixer.

15. The compressor-cooler module of claim 14, further comprising a swirler formed as a portion of said cover.

16. The compressor-cooler module of claim 15, further comprising:
- a plurality of vanes formed in said swirler for reducing the velocity of air flowing into said swirler; and
- at least one opening formed in said mixer, said mixer being substantially cylindrical in shape, and exhaust gas passes through said at least one opening formed in said mixer as exhaust gas enters said mixer.

17. The compressor-cooler module of claim 14, said separator further comprising a wire mesh surrounding said mixer such that exhaust gas entering said separator unit flows through said wire mesh and then through said plurality of openings.

18. The compressor-cooler module of claim 14, further comprising a silencer formed as a portion of said housing.

19. The compressor-cooler module of claim 18, said silencer further comprising a series of chambers.

20. The compressor-cooler module of claim 19, wherein said series of chambers are of different sizes.

21. The compressor-cooler module of claim 19, wherein said series of chambers are of the same size and filled with a filler, and said filler reduces the noise produced by said compressor.

22. A compressor-cooler module, comprising:
- a housing;
- a compressor contained in said housing;
- an air cooler disposed within said housing and positioned in the flow path of said compressor;
- at least one exhaust gas recirculation valve contained in said housing;
- an intake in fluid communication with said housing;
- a cooler bypass valve operably associated with said air cooler and said compressor; and
- a high-pressure exhaust gas recirculation passage operably associated with said compressor; wherein said at least one exhaust gas recirculation valve selectively directs exhaust gas from said high-pressure exhaust gas recirculation passage to said air cooler, and said cooler bypass valve selectively directs exhaust gas to bypass said air cooler.

23. The compressor-cooler module of claim 12, further comprising a separator unit formed as a portion of said housing, located upstream or downstream of said compressor.

24. The compressor-cooler module of claim 23, said separator unit further comprising:
- a cover in fluid communication with said compressor and said air cooler;
- a mixer disposed within said cover of said separator unit;

a plurality of openings formed in said mixer such that as exhaust gas enters said mixer, exhaust gas will pass through said plurality of openings; and a separator disposed about said mixer such that exhaust gas entering said cover passes through said separator before entering said plurality of openings of said mixer, causing any particles in the exhaust gas to be removed, and after exhaust gas passes through said separator and flows into said mixer.

25. The compressor-cooler module of claim 24, further comprising a swirler formed as a portion of said cover.

26. The compressor-cooler module of claim 25, further comprising:

a plurality of vanes formed in said swirler for reducing the velocity of air flowing into said swirler; and at least one opening formed in said mixer, said mixer being substantially cylindrical in shape, and exhaust gas passes through said at least one opening formed in said mixer as exhaust gas enters said mixer.

27. The compressor-cooler module of claim 24, said separator further comprising a wire mesh surrounding said mixer such that exhaust gas entering said separator unit flows through said wire mesh and then through said plurality of openings.

28. The compressor-cooler module of claim 24, further comprising a silencer formed as a portion of said housing.

29. The compressor-cooler module of claim 28, said silencer further comprising a series of chambers.

30. The compressor-cooler module of claim 29, wherein said series of chambers are of different sizes.

31. The compressor-cooler module of claim 29, wherein said series of chambers are of the same size and filled with a filler, and said filler reduces the noise produced by said compressor.

* * * * *

UNITED STATES PATENT AND TRADEMARK OFFICE
CERTIFICATE OF CORRECTION

| | | |
|---|---|---|
| PATENT NO. | : 8,122,717 B2 | Page 1 of 1 |
| APPLICATION NO. | : 12/440480 | |
| DATED | : February 28, 2012 | |
| INVENTOR(S) | : Volker Joergl, Olaf Weber and Wolfgang Wenzel | |

It is certified that error appears in the above-identified patent and that said Letters Patent is hereby corrected as shown below:

Title Page item (73), Assignee: "BorgWarner, Inc." should be --BorgWarner Inc.--.

Signed and Sealed this
Thirtieth Day of July, 2013

Teresa Stanek Rea
*Acting Director of the United States Patent and Trademark Office*